United States Patent [19]
Merchant et al.

[11] Patent Number: 6,094,717
[45] Date of Patent: Jul. 25, 2000

[54] COMPUTER PROCESSOR WITH A REPLAY SYSTEM HAVING A PLURALITY OF CHECKERS

[75] Inventors: Amit A. Merchant; David J. Sager, both of Portland; Darrell D. Boggs, Aloha; Michael D. Upton, Portland, all of Oreg.

[73] Assignee: Intel Corp., Santa Clara, Calif.

[21] Appl. No.: 09/126,658

[22] Filed: Jul. 31, 1998

[51] Int. Cl.⁷ .................................................. G06F 9/38
[52] U.S. Cl. ............................................ 712/32; 712/244
[58] Field of Search ........................... 709/106; 712/244, 712/32, 217

[56] References Cited

U.S. PATENT DOCUMENTS

| | | | |
|---|---|---|---|
| 5,519,841 | 5/1996 | Sager | 711/202 |
| 5,784,588 | 7/1998 | Leung | 712/216 |
| 5,835,745 | 11/1998 | Sager | 712/215 |
| 5,870,607 | 2/1999 | Netzer | 717/4 |
| 5,966,544 | 10/1999 | Sager | 712/32 |
| 5,987,594 | 11/1999 | Panwar | 712/216 |
| 6,006,326 | 12/1999 | Panwar | 712/217 |

*Primary Examiner*—Eric Coleman
*Attorney, Agent, or Firm*—Kenyon & Kenyon

[57] ABSTRACT

A computer processor includes a multiplexer having a first input, a second input, a third input, and an output. The processor further includes a scheduler coupled to the multiplexer first input, an execution unit coupled to the multiplexer output, and a replay system that has an input coupled to the multiplexer output. The replay system includes a first checker coupled to the replay system input and the second multiplexer input, and a second checker coupled to the first checker and the third multiplexer input.

30 Claims, 6 Drawing Sheets

COMPUTER PROCESSOR WITH A REPLAY SYSTEM HAVING A PLURALITY OF CHECKERS

FIELD OF THE INVENTION

The present invention is directed to a computer processor. More particularly, the present invention is directed to a computer processor with a replay system that has a plurality of checkers.

BACKGROUND OF THE INVENTION

The primary function of most computer processors is to execute computer instructions. Most processors execute instructions in the programmed order that they are received. However, some recent processors, such as the Pentium® II processor from Intel Corp., are "out-of-order" processors. An out-of-order processor can execute instructions in any order as the data and execution units required for each instruction becomes available. Therefore, with an out-of-order processor, execution units within the processor that otherwise may be idle can be more efficiently utilized.

With either type of processor, delays can occur when executing "dependent" instructions. A dependent instruction, in order to execute correctly, requires a value produced by another instruction that has executed correctly. For example, consider the following set of instructions:

1) Load memory-1→register-X;
2) Add1 register-X register-Y→register-Z;
3) Add2 register-Y register-Z→register-W.

The first instruction loads the content of memory-1 into register-X. The second instruction adds the content of register-X to the content of register-Y and stores the result in register-Z. The third instruction adds the content of register-Y to the content of register-Z and stores the result in register-W. In this set of instructions, instructions 2 and 3 are dependent instructions that are dependent on instruction 1 (instruction 3 is also dependent on instruction 2). In other words, if register-X is not loaded with the proper value in instruction 1 before instructions 2 and 3 are executed, instructions 2 and 3 will likely generate incorrect results. Dependent instructions can cause a delay in known processors because most known processors typically do not schedule a dependent instruction until they know that the instruction that the dependent instruction depends on will produce the correct result.

Referring now in detail to the drawings, wherein like parts are designated by like reference numerals throughout, FIG. 1 is a block diagram of a processor pipeline and timing diagram illustrating the delay caused by dependent instructions in most known processors. In FIG. 1, a scheduler 10 schedules instructions. The instructions proceed through an execution unit pipeline that includes pipeline stages 12, 14, 16, 18, 20, 22 and 24. During each pipeline stage a processing step is executed. For example, at pipeline stage 12 the instruction is dispatched. At stage 14 the instruction is decoded and source registers are read. At stage 16 a memory address is generated (for a memory instruction) or an arithmetic logic unit ("ALU") operation is executed (for an arithmetic or logic instruction). At stage 18 cache data is read and a lookup of the translation lookaside buffer ("TLB") is performed. At stage 20 the cache Tag is read. At stage 22 a hit/miss signal is generated as a result of the Tag read. The hit/miss signal indicates whether the desired data was found in the cache (i.e., whether the data read from the cache at stage 18 was the correct data). As shown in FIG. 1, the hit/miss signal is typically generated after the data is read at stage 18, because generating the hit/miss signal requires the additional steps of TLB lookup and Tag read.

The timing diagram of FIG. 1 illustrates the pipeline flow of two instructions: a memory load instruction ("Ld") and an add instruction ("Add"). The memory load instruction is a two-cycle instruction, the add instruction is a one-cycle instruction, and the add instruction is dependent on the load instruction. At time=0 (i.e., the first clock cycle) Ld is scheduled and dispatched (pipeline stage 12). At time=1, time=2 and time=3, Ld moves to pipeline stages 14, 16 and 18, respectively. At time=4, Ld is at pipeline stage 20. At time=5, Ld is at stage 22 and the hit/miss signal is generated. Scheduler 10 receives this signal. Finally at time=6, assuming a hit signal is received indicating that the data was correct, scheduler 10 schedules Add to stage 12, while Ld continues to stage 24, which is an additional pipeline stage. The add operation is eventually performed when Add is at stage 16. However, if at time=6 a miss signal is received, scheduler 10 will wait an indefinite number of clock cycles until data is received by accessing the next levels of the cache hierarchy.

As shown in the timing diagram of FIG. 1, Add, because it is dependent on Ld, cannot be scheduled until time=6, at the earliest. A latency of an instruction may be defined as the time from when its input operands must be ready for it to execute until its result is ready to be used by another instruction. Therefore, the latency of Ld in the example of FIG. 1 is six. Further, as shown in FIG. 1, scheduler 10 cannot schedule Add until it receives the hit/miss signal. Therefore, even if the time required to read data from a cache decreases with improved cache technology, the latency of Ld will remain at six because it is dependent on the hit/miss signal.

Reducing the latencies of instructions in a processor is sometimes necessary to increase the operating speed of a processor. For example, suppose that a part of a program contains a sequence of N instructions, $I_1, I_2, I_3, \ldots, I_N$. Suppose that $I_{n+1}$ requires, as part of its inputs, the result of $I_n$, for all n, from 1 to N–1. This part of the program may also contain any other instructions. The program cannot be executed in less time than $T=L_1+L_2+L_3+\ldots+L_N$, where $L_n$ is the latency of instruction $I_n$, for all n from 1 to N. In fact, even if the processor was capable of executing a very large number of instructions in parallel, T remains a lower bound for the time to execute this part of this program. Hence to execute this program faster, it will ultimately be essential to shorten the latencies of the instructions.

Based on the foregoing, there is a need for a computer processor that can schedule instructions, especially dependent instructions, faster than known processors, and therefore reduces the latencies of the instructions.

SUMMARY OF THE INVENTION

One embodiment of the present invention is a computer processor that includes a multiplexer having a first input, a second input, a third input, and an output. The processor further includes a scheduler coupled to the multiplexer first input, an execution unit coupled to the multiplexer output, and a replay system that has an input coupled to the multiplexer output. The replay system includes a first checker coupled to the replay system input and the second multiplexer input, and a second checker coupled to the first checker and the third multiplexer input.

DETAILED DESCRIPTION

One embodiment of the present invention is a processor that speculatively schedules instructions and that includes a replay system. The replay system replays instructions that were not executed correctly when they were initially dispatched to an execution unit while preserving the originally scheduled order of the instructions. The replay system includes two checkers, and arbitration between the two checkers to avoid collisions of replayed instructions.

Figure 1:
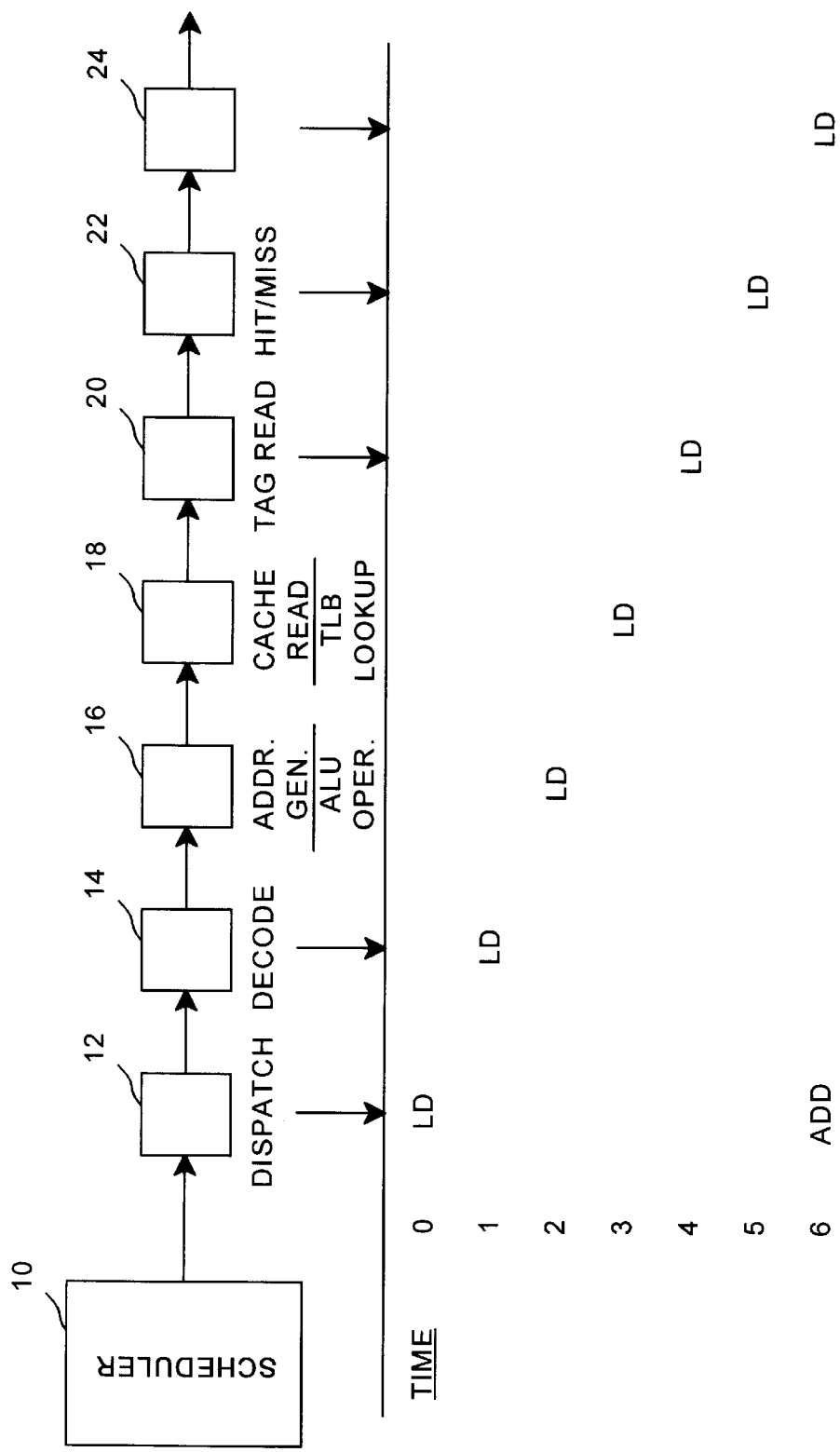
FIG. 1 is a block diagram of a prior art processor pipeline and timing diagram illustrating the delay caused by dependent instructions in most known processors.
Figure 2:
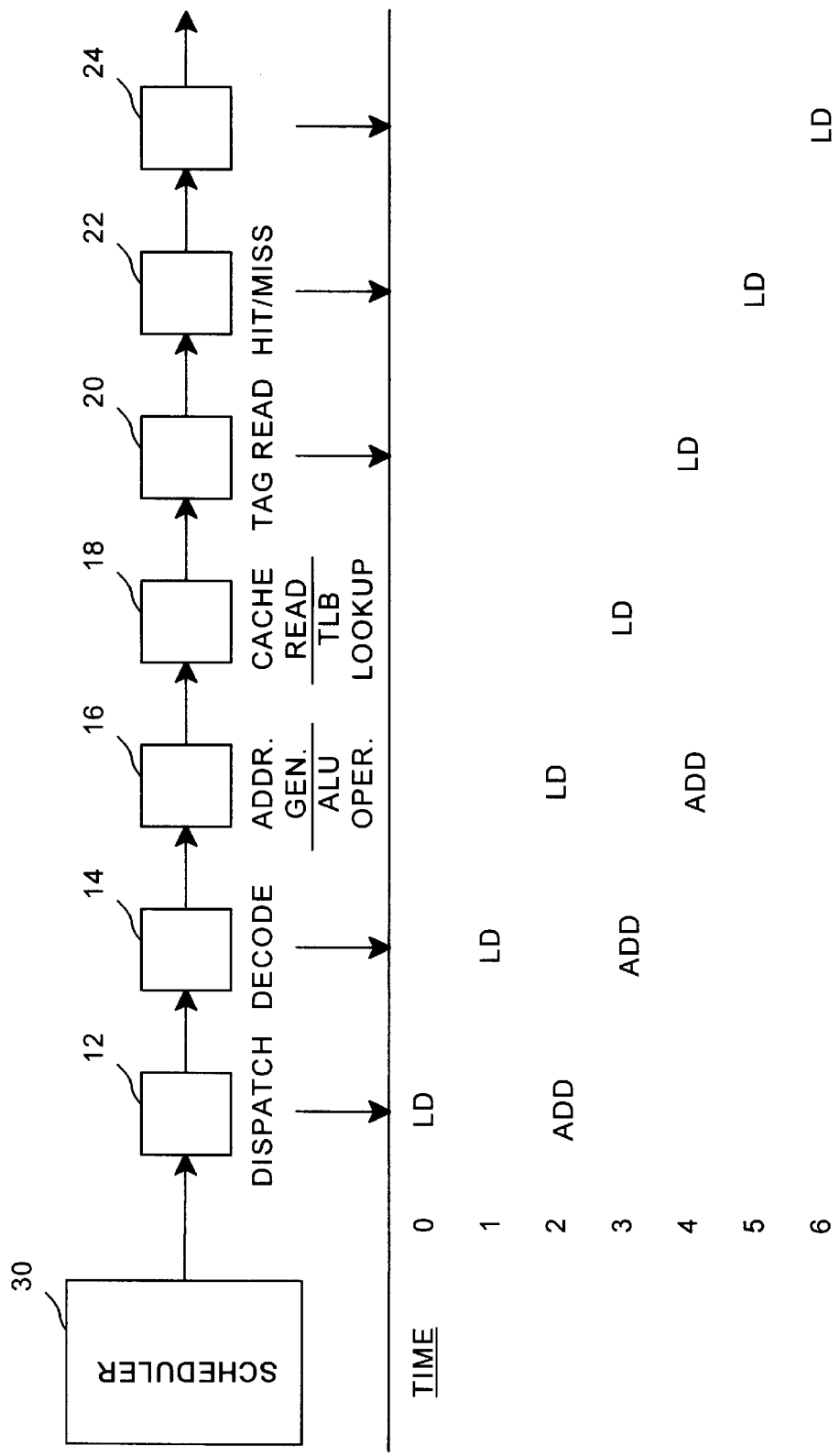
FIG. 2 is a block diagram of a processor pipeline and timing diagram in accordance with one embodiment of the present invention.

FIG. 2 is a block diagram of a processor pipeline and timing diagram in accordance with one embodiment of the present invention. In FIG. 2, a scheduler 30 schedules instructions to pipeline stages 12, 14, 16, 18, 20, 22 and 24, which are identical in function to the stages shown in FIG. 1. The timing diagram of FIG. 2 illustrates a two-cycle Ld followed by a one-cycle Add. Scheduler 30 speculatively schedules Add without waiting for a hit/miss signal from Ld. Therefore, Add is scheduled at time=2, so that a two stage distance from Ld is maintained because Ld is a two-cycle instruction. Add is eventually executed at time=4 when it arrives at stage 16, which is one cycle after Ld performs the cache read at stage 18.

By speculatively scheduling Add, scheduler 30 assumes that Ld will execute correctly (i.e., the correct data will be read from the cache at stage 18). A comparison of FIG. 2 with FIG. 1 illustrates the advantages of speculatively scheduling Add. Specifically, in FIG. 1, the Add instruction was not scheduled until time=6, thus Ld had a latency of six. In contrast, in FIG. 2 the Add instruction was scheduled at time=2, thus Ld had a latency of only two, or four less than the Ld in FIG. 1. Further, scheduler 30 in FIG. 2 has slots available to schedule additional instructions at time=3 through time=6, while scheduler 10 in FIG. 1 was able to only schedule one add instruction by time=6. Therefore, the present invention, by speculatively scheduling, reduces the latency of instructions and is able to schedule and process more instructions than the prior art.

However, the present invention must account for the situation when an instruction is speculatively scheduled assuming that it will be executed correctly, but eventually is not executed correctly (e.g., in the event of a cache miss). The present invention resolves this problem by having a replay system. The replay system replays all instructions that executed incorrectly.

Figure 3:
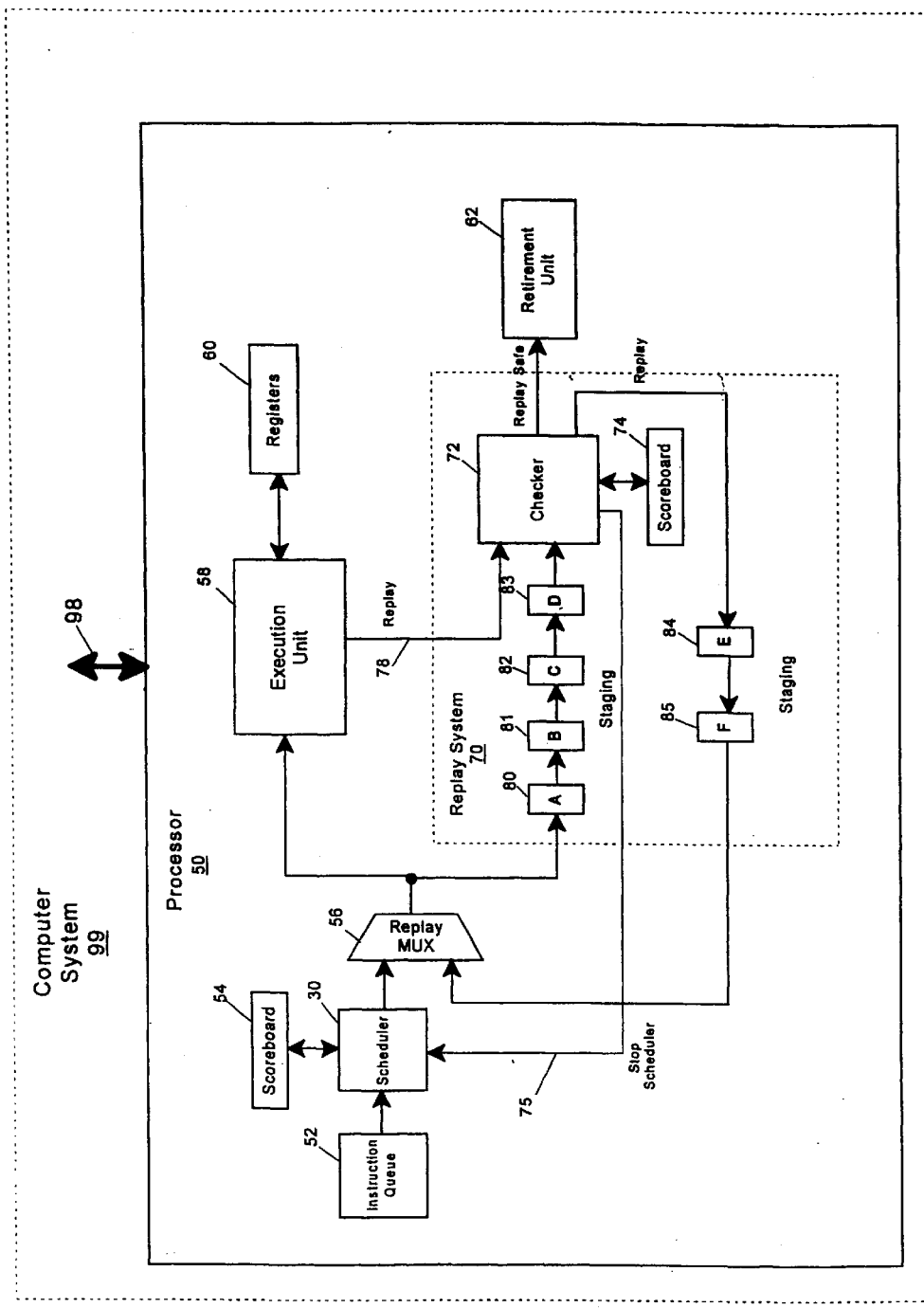
FIG. 3 is a block diagram of a processor with a replay system having one checker.

FIG. 3 is a block diagram of a computer processor with a replay system having one checker. The processor 50 is included in a computer system 99. Processor 50 is coupled to other components of computer 99, such as a memory device (not shown) through a system bus 98.

Processor 50 includes an instruction queue 52. Instruction queue 52 feeds instructions into scheduler 30. In one embodiment, the instructions are "micro-operations." Micro-operations are generated by translating complex instructions into simple, fixed length instructions for ease of execution.

Scheduler 30 dispatches an instruction received from instruction queue 52 when the resources are available to execute the instruction and when sources needed by the instruction are indicated to be ready. Scheduler 30 is coupled to a scoreboard 54. Scoreboard 54 indicates the readiness of each source (i.e., each register) in processor 50.

In one embodiment, scoreboard 54 allocates one bit for each register, and if the bit is a "1" the register is indicated to be ready. Scheduler 30 schedules instructions based on the scoreboard's status of the registers. For example, suppose a "Ld X→Reg-3" instruction (i.e., load the value in memory location "X" to register 3) is followed by an "Add Reg-3→Reg-4" instruction (i.e., add the value in register-3 to the value in register-4 and store it in register-4). The Add instruction is dependent on the Ld instruction because Reg-3 must be ready before the Add instruction is executed. Scheduler 30 will first schedule the Ld instruction, which is a two-cycle instruction. Scheduler 30 will then check scoreboard 54 on each cycle to determine if Reg-3 is ready. Scoreboard 54 will not indicate that Reg-3 is ready until the second cycle, because Ld is a two-cycle instruction. On the second cycle scheduler 30 checks scoreboard 54 again, sees the indication that Reg-3 is now ready, and schedules the Add instruction on that cycle. Therefore, through the use of scoreboard 54, scheduler 30 is able to schedule instructions in the correct order with proper spacing.

Scheduler 30 speculatively schedules instructions because the instructions are scheduled when a source is indicated to be ready by scoreboard 54. However, scheduler 30 does not determine whether a source is in fact ready before scheduling an instruction needing the source. For example, a load instruction may be a two-cycle instruction. This may mean that the correct data is loaded into a register in two cycles (not counting the dispatch and decode stage) if the correct data is found in a first level of memory (e.g., a first level cache hit). Scoreboard 54 indicates that the source is ready after two cycles. However, if the correct data was not found in the first level of memory (e.g., a first level cache miss), the source is actually not ready after two cycles. However, based on scoreboard 54, scheduler 30 will speculatively schedule the instruction anyway.

Scheduler 30 outputs the instructions to a replay multiplexer 56. The output of multiplexer 56 is coupled to an execution unit 58. Execution unit 58 executes received instructions. Execution unit 58 can be an arithmetic logic unit ("ALU"), a floating point ALU, a memory unit, etc. Execution unit 58 is coupled to registers 60 which are the registers of processor 50. Execution unit 58 loads and stores data in registers 60 when executing instructions.

Processor 50 further includes a replay system 70. Replay system 70 replays instructions that were not executed correctly after they were scheduled by scheduler 30. Replay system 70, like execution unit 58, receives instructions output from replay multiplexer 56. Replay system 70 includes two staging sections. One staging section includes a plurality of stages 80–83. The other staging sections includes stages 84 and 85. Therefore, instructions are staged through replay system 70 in parallel to being staged through execution unit 58. The number of stages 80–85 vary depending on the amount of staging desired in each execution channel.

Replay system 70 further includes a checker 72. Checker 72 receives instructions from stage 83 and determines whether each instruction has executed correctly. If the instruction has executed correctly, checker 72 declares the instruction "replay safe" and the instruction is forwarded to a retirement unit 62 where it is retired. Retiring instructions is beneficial to processor 50 because it frees up processor resources and allows additional instructions to start execution. If the instruction has not executed correctly, checker 72 replays or re-executes the instruction by sending the instruction to replay multiplexer 56 via stages 84 and 85.

In conjunction with sending the replayed instruction to replay multiplexer 56, checker 72 sends a "stop scheduler" signal 75 to scheduler 30. Stop scheduler signal 75 is sent at least one clock cycle in advance of the replayed instruction arriving at replay multiplexer 56. In one embodiment, stop scheduler signal 75 tells scheduler 30 to not schedule an instruction on the next clock cycle. In other embodiments, stop scheduler signal 75 tells scheduler 30 not to schedule an instruction on the clock cycle after the next clock cycle, or the clock cycle after that, etc., depending on how far in advance of the replayed instruction checker 72 sends stop scheduler signal 75. This creates an open slot for the replayed instruction that is output from replay multiplexer 56, and avoids two instructions being input to replay multiplexer 56 on the same clock cycle.

An instruction may execute incorrectly for many reasons. The most common reasons are a source dependency or an external replay condition. A source dependency can occur when an instruction source is dependent on the result of another instruction. Examples of an external replay condition include a cache miss, incorrect forwarding of data (e.g., from a store buffer to a load), hidden memory dependencies, a write back conflict, an unknown data/address, and serializing instructions.

Checker 72 may determine that an instruction should be replayed based on an external signal (e.g., replay signal 78) which indicates an external replay condition. Execution unit 58 sends replay signal 78 to checker 72. Replay signal 78 indicates whether an instruction has executed correctly or not. Replay signal 78 is staged so that it arrives at checker 72 at the same point that the instruction in question arrives at checker 72. For example, if the instruction in question is a Ld, replay signal 78 is a hit/miss signal. The Ld instruction is staged in replay system 70 so that it arrives at checker 72 at the same time that the hit/miss signal for that Ld instruction is generated by execution unit 58. Therefore, checker 72 can determine whether to replay the Ld instruction based on the received hit/miss signal.

Checker 72 is also coupled to a scoreboard 74 which, like scoreboard 54, indicates which registers have valid data. Using scoreboard 74, checker 72 can determine that an instruction has not executed correctly because the data in the required register is not valid (i.e., the instruction's source inputs are not correct). For example, if a Ld instruction was a miss, and the next instruction received by checker 72 is an Add instruction that is dependent on the Ld instruction, checker 72, by using scoreboard 74, will determine that the Add instruction did not execute correctly because the data in the register needed by the Add instruction is not valid.

In summary, when checker 72 receives an instruction, it determines: (1) are the instruction's source inputs correct using scoreboard 74; and (2) is there an external replay condition based on replay signal 78 received from execution unit 58. If the source inputs are correct and there is no external replay condition, the instruction is replay safe and forwarded to retirement unit 62. However, if either the source inputs are not correct, or there is an external replay condition, the instruction is replayed.

Figure 4:
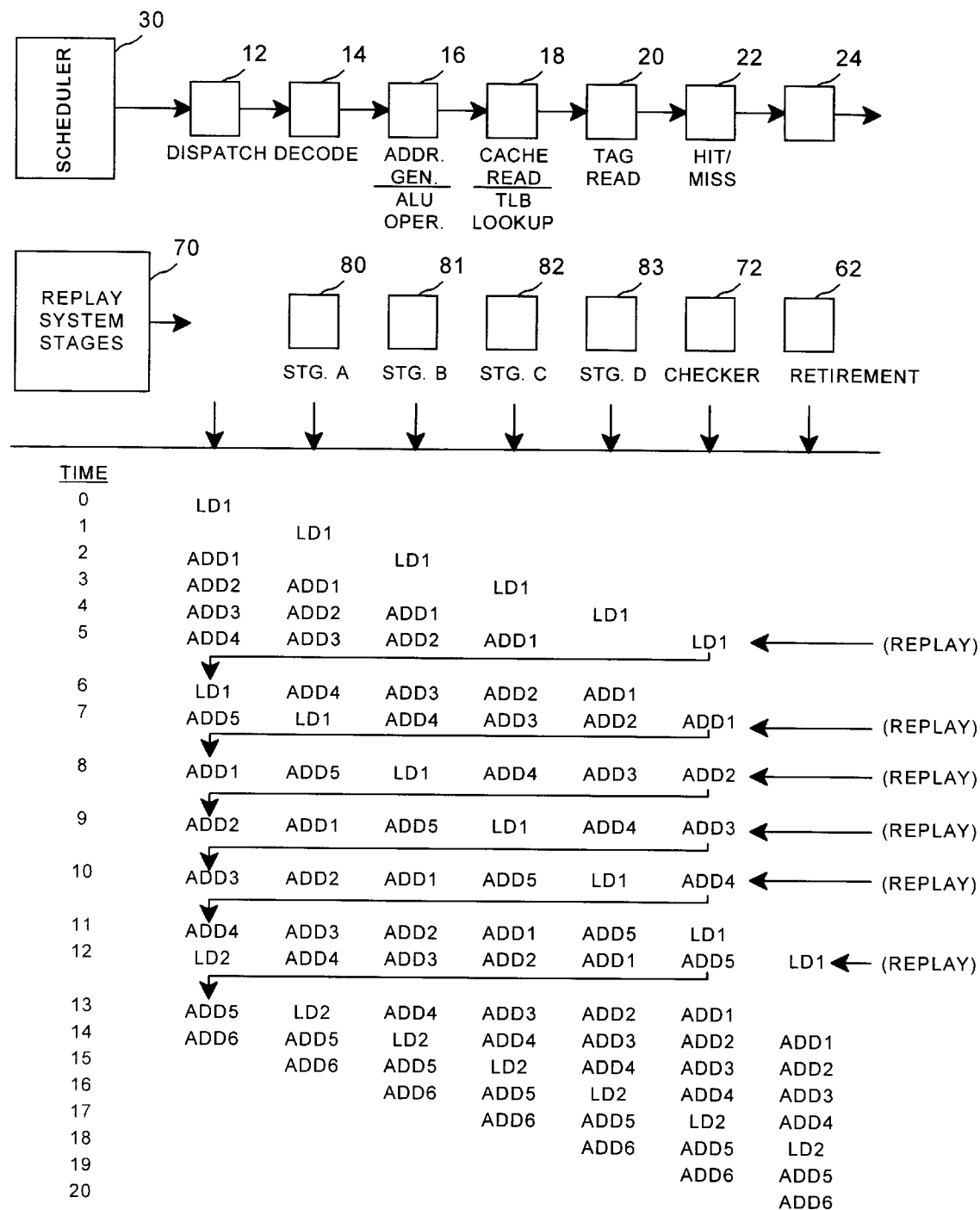
FIG. 4 is a block diagram illustrating the stages of an execution unit and the parallel stages of a replay system in accordance with one embodiment of the present invention.

FIG. 4 is a block diagram illustrating the stages of execution unit 58 and the parallel stages of replay system 70 in accordance with one embodiment of the present invention. For example, an instruction at decode stage 14 of execution unit 58 will, in parallel, be at stage A (i.e., stage 80) of replay system 70. Further, an instruction at hit/miss stage 22 of execution unit 58 will, in parallel, be at checker 72 of replay system 70. For simplicity purposes, the replay system whose stages are shown in FIG. 4 does not include stages E and F (i.e., stages 84 and 85) of replay system 70 of FIG. 3. Therefore, instructions that are replayed by checker 72 are re-dispatched at replay multiplexer 56 on the next clock cycle without being staged.

FIG. 4 also illustrates a timing diagram of the following set of instructions, with the following dependencies:

| Program Order | Dependencies |
| --- | --- |
| Ld1 | |
| Add1 | on Ld1 |
| Add2 | on Add1 |
| Add3 | on Add2 |
| Add4 | on Add3 |
| Ld2 | |
| Add5 | on Add4 |
| Add6 | on Add5 |

The load instructions ("Ld") are two-cycle instructions and the add instructions ("Add") are one cycle instructions. As shown, Add1 is dependent on Ld1, Add2 is dependent on Add1, etc.

Referring to the timing diagram of FIG. 4, at time=0 Ld2 is dispatched. At time=1, Ld1 moves to decode 14 stage of execution unit 58, and stage A of replay system 70. At time=2, Add1 is scheduled, because Ld1 is a two-cycle instruction. Similarly, at time=3 and 4 Add2 and Add3 are scheduled, respectively. At time=5, Ld1 is at hit/miss stage 22 and at checker 72 of the replay system. Assume a miss signal is received at time=5. The miss signal (which is replay signal 78 of FIG. 3) is received by checker 72. Checker 72, based on the miss signal, determines that Ld1 executed incorrectly and replays Ld1 at time=5. Checker 72, also at time=5, sends a stop scheduler signal 75 to scheduler 30 which signals scheduler 30 to not schedule an instruction at the next cycle (i.e., at time=6).

At time=6, Ld1 returns to dispatch stage 12. Note that scheduler 30 did not schedule an instruction at time=6 so that Ld1 was able to occupy the vacant slot. At time=7, Add5 is scheduled and Add1 is at checker 72. Checker 72, using scoreboard 74, determines that Add1 executed incorrectly because Add1 was dependent on Ld1. Because Ld1 executed incorrectly, scoreboard 74 indicates that the data in the register needed by Add1 is invalid. Therefore, checker 72 replays Add1 at time=7, while sending another stop scheduler signal 75 to scheduler 30. Similarly, at time=8 checker 72 replays Add2, at time=9 checker 72 replays Add3, and at time=10 checker 72 replays Add4.

At time=11, Ld1 is once again at checker 72. This time checker 72 receives a hit signal indicating that Ld1 executed correctly. Therefore, at time=12, since no instructions were replayed by checker 72 at time=11, scheduler 30 can finally schedule Ld2 (multiple loads can be in the pipeline at the same time). Meanwhile, Ld1 moves to retirement unit 62. Further, at time=12, checker 72 determines that Add5 executed incorrectly because Add5 is dependent on Ld1. Therefore, checker 72 replays Add5 at time=12.

At time=13, Add5 returns to dispatch 12, and Add1 is at checker 72. This time checker 72 determines that Add1 executed correctly because scoreboard 74 indicates that the register has valid data. At time=14, Add6 is dispatched and Add1 is retired. At times=15 through times=20, the remaining instructions in the pipeline execute correctly and eventually are all retired.

As shown in FIG. 4, the scheduled order of the instruction is always preserved by replay system 70. For example, Add1, Add2 and Add3 always execute after Ld1 and Add1 always remains two stages behind Ld1. Further, replay system 70, through stop scheduler signal 75, inserts replayed instructions in empty slots when scheduler 30 does not schedule an instruction.

Figure 5:
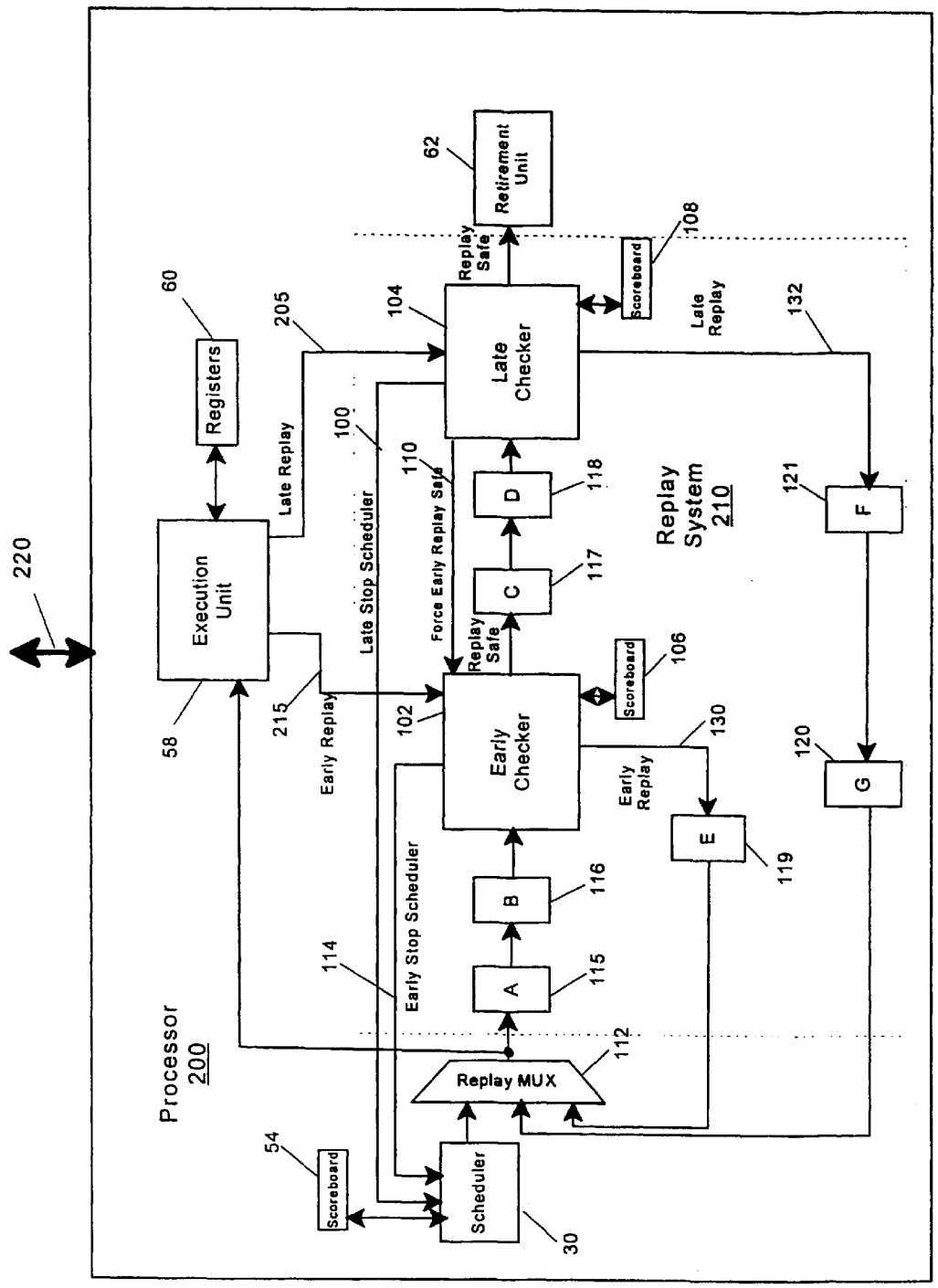
FIG. 5 is a block diagram of a processor with a replay system having two checkers in accordance with one embodiment of the present invention.

FIG. 5 is a block diagram of a processor with a replay system having two checkers in accordance with one embodiment of the present invention. Processor 200 includes execution unit 58, scheduler 30, a replay multiplexer 112, and a replay system 210. Processor 200 is coupled to other components of a computer system, such as a memory device (not shown), through a system bus 220.

Replay system 210 includes stages 115–121, an early checker 102 and a late checker 104. Each stage 115–121 holds an instruction for one clock cycle. A scoreboard 106 is coupled to early checker 102 and a scoreboard 108 is coupled to late checker 104.

Early checker 102 receives an instruction output from replay multiplexer 112 after the instruction proceeds through stages 115 and 116. Early checker 102 receives an early replay signal 215 from execution unit 58. Early replay signal 215 provides the same function as replay signal 78 of FIG. 3 (i.e., it informs early checker 102 of an external replay condition). When early checker 102 receives an instruction, it determines whether the instruction executed correctly in a similar manner as checker 72 of FIG. 3. Specifically, early checker 102 determines whether the instruction's source inputs are correct using scoreboard 106 and whether there is an external replay condition based on early replay signal 215 from execution unit 58.

If early checker 102 determines that an instruction has executed correctly, that instruction is replay safe and is forwarded to stage 117. If the instruction has not executed correctly (based on scoreboard 106 or early replay signal 215), early checker 102 replays the instruction by sending the instruction to an input of replay multiplexer 112 via stage 119. In conjunction with sending the replayed instruction to replay multiplexer 112, early checker 102 sends an "early stop scheduler" signal 114 to scheduler 30. Early stop scheduler signal 114 is similar to stop scheduler signal 75 of FIG. 3. Early stop scheduler signal 114 tells scheduler 30 not to schedule an instruction on the same clock cycle that the replayed instruction from early checker 102 is input to replay multiplexer 112. This creates an open slot in the instruction stream for the replayed instruction and prevents more than one instruction from being input to replay multiplexer 112 on the same clock cycle.

Early checker 102 is coupled to late checker 104 through line 110. Early checker 102 can receive a "force early replay safe" signal on line 110. When early checker 102 receives a force early replay safe signal 110, the instruction received by early checker 102 on the next clock cycle is automatically considered early replay safe and forwarded to stage 117. In other words, early checker 102 assumes that the next instruction has executed correctly after receiving force early replay signal 110, regardless of the information received from scoreboard 106 and early replay signal 215.

An instruction output from stage 117 passes through stage 118 and then is input to late checker 104. Late checker 104 receives a late replay signal 205 from execution unit 58. Late replay signal 205 provides the same function as replay signal 78 of FIG. 3. When late checker 104 receives an instruction, it determines whether the instruction executed correctly in a similar manner as checker 72 of FIG. 3. Specifically, late checker 104 can determine whether an instruction has executed correctly based on an external replay condition (via late replay signal 205) or through the use of scoreboard 108.

If late checker 104 determines that an instruction has executed correctly, that instruction is replay safe and is forwarded to retirement unit 62 where it is retired. If the instruction has not executed correctly, late checker 104 replays the instruction by sending the instruction to an input of replay multiplexer 112 via stages 120 and 121. In conjunction with sending the replayed instruction to replay multiplexer 112, late checker 104 sends a "late stop scheduler" signal 100 to scheduler 30. Late stop scheduler signal 100 is similar to early stop scheduler signal 114 and stop scheduler signal 75 of FIG. 3. Late stop scheduler signal 100 tells scheduler 30 not to schedule an instruction on the same clock cycle that the replayed instruction from late checker 104 is input to replay multiplexer 112. This creates an open slot in the instruction stream for the replayed instruction and prevents more than one instruction from being input to replay multiplexer 112 on the same clock cycle.

Also in conjunction with sending the late replayed instruction to replay multiplexer 112, late checker 104 sends force early replay safe signal 110 to early checker 102. As discussed, force early replay safe signal 110 causes early checker 102 to automatically consider the next instruction replay safe. This prevents a replayed instruction from early checker 102 and a replayed instruction from late checker 104 from being input to replay multiplexer 112 on the same clock cycle, which would cause a collision between the two instructions. Therefore, force early replay safe signal 110 provides arbitration between early checker 102 and late checker 104.

In some circumstances, early checker 102 will not replay an instruction that has not executed correctly because early checker 102 received a force early replay safe signal 110 from late checker 104. However, this will not negatively affect the operation of processor 200 because the instruction will eventually be replayed by late checker 104. Therefore, an instruction that has not executed correctly will not inadvertently be retired.

One reason for having both early checker 102 and late checker 104 is because the external replay conditions generated by execution unit 58 are generated at different stages in the pipeline. As a result, some external replay conditions are generated earlier than others. For example, in a memory load execution unit, a cache miss replay condition will be generated well before a TLB miss replay condition. Because early checker 102 is earlier in the pipeline than late checker 104, early checker 102 will receive a subset of the generated external replay conditions via early replay signal 215 (i.e., the external replay conditions that are generated early). However, late checker 104 will receive all of the external replay conditions via late replay signal 205 because it is further along the pipeline. One advantage of this arrangement is that early checker 102 is able to replay some instructions as quickly as possible based on earlier generated external replay conditions. The performance of processor 200 improves because instructions are replayed more quickly. By ensuring that late checker 104 receives a superset of all external replay conditions, replay system 210 is designed to catch any operation that has executed incorrectly at late checker 104 and replay it. Any escapes from early checker 102 will be caught at late checker 104.

In one embodiment, instructions are received by early checker 102 fourteen clock cycles after they are dispatched, and instructions are received by late checker 104 twenty-four clock cycles after they are dispatched.

Separate scoreboards 106 and 108 insure that when an instruction is replayed, all of its dependent instructions are replayed by the same checker. This preserves the originally scheduled order of the instructions and enhances the performance of processor 200. Therefore, if a first instruction is replayed by early checker 102, scoreboard 106 will be updated so that all instructions that are dependent on the first instruction will also be replayed by early checker 102 based on sources not being ready. Scoreboard 108 provides a similar function for late checker 104.

Similarly, when the first instruction is declared replay safe by a checker, that checker's scoreboard should be updated so that all instructions dependent on the first instruction are also declared replay safe and the scheduled order is preserved. Therefore, when early checker 102 receives a force early replay safe signal 110 from late checker 104, scoreboard 106 is also updated for that instruction.

The number of stages 115–121 can vary between embodiments of the present invention depending on the number of pipeline stages in execution unit 58. However, the number of stages between late checker 104 and replay multiplexer 112 (e.g., stages 120 and 121) should differ from the number of stages between early checker 102 and replay multiplexer 112 (e.g., stage 119). This prevents a replayed instruction from late checker 104 from colliding with a replayed instruction from early checker 102 that was replayed before early checker 102 received force early replay safe signal 110. If the number of stages for early checker 102 and late checker 104 are equal, some other mechanism should be implemented to prevent collisions between two replayed instructions.

In one embodiment, processor 200 is a multi-channel processor. Each channel includes all of the components shown in FIG. 5. However, the execution unit 58 for each channel will differ. For example, execution unit 58 for one channel will be a memory unit, execution unit 58 for another channel will be an arithmetic unit, etc. Each channel includes its own replay system 210.

In one embodiment, processor 200 is a multi-threaded processor. In this embodiment, late checker 104 causes some of the threads to be retired while others are replayed. Therefore, late checker 104 allows execution unit 58 to be more efficiently used by many threads.

Figure 6:
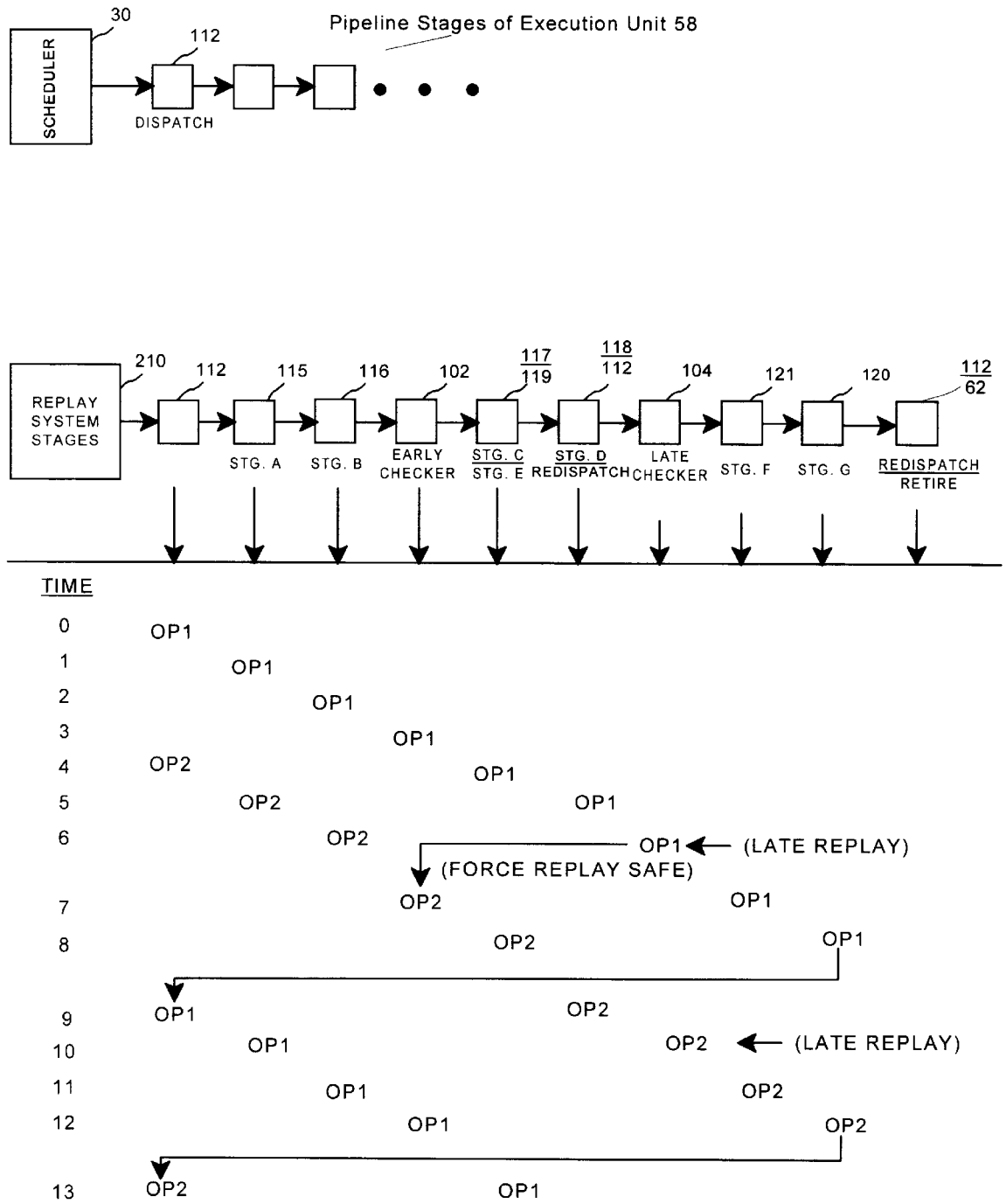
FIG. 6 is a block diagram of the pipeline stages of an execution unit and the parallel stages of a replay system in accordance with one embodiment of the present invention.

FIG. 6 is a block diagram of the pipeline stages of execution unit 58 and the parallel stages of replay system 210. FIG. 6 further illustrates an example timing diagram of a first dispatched generic instruction ("OP1") followed by a second dispatched generic instruction ("OP2").

At time=0, OP1 is dispatched at replay multiplexer 112. OP1 in parallel proceeds through the pipeline stages of execution unit 58 and replay system 210.

At time=1 and time=2, OP1 is at stage A and stage B, respectively, of replay system 210. At time=3, OP1 is received by early checker 102. Early checker 102 declares OP1 early replay safe. Therefore, at time=4, OP1 is output to stage C. Further, at time=4 OP2 is dispatched.

At time=5, OP2 is at stage A and OP1 is at stage D. At time=6, OP2 is at stage B and OP1 is at late checker 104.

Late checker 104 determines that OP1 did not execute correctly. Therefore, OP1 is sent to stage F at time=7, and late checker 104 sends a force early replay safe signal 110 to early checker 102 that is received by early checker 102 at time=7. At time=7, OP2 is at early checker 102 and early checker 102 receives an external early replay signal 215. However, because of the force early replay safe signal 110, early checker 102 automatically considers OP2 early replay safe instead of replaying OP2.

At time=8, OP2 is at stage C and OP1 is at stage G. At time=9, OP1 is re-dispatched at replay multiplexer 112, and OP2 moves to stage D. It should be noted that if at time=7 OP2 was replayed by early checker 102, OP2 would be re-dispatched at time=9, thus colliding with OP1. Therefore, the force early replay safe signal 110 sent at time=6 prevented this possible collision.

At time=10, OP1 is at stage A and OP2 is at late checker 104. Late checker 104 determines that OP2 did not execute correctly. At time=11 and time=12, OP1 moves to early checker 102 and OP2 moves to stage G. Finally, at time=13 OP2 is re-dispatched while OP1 moves to stage C. Assuming OP1 and OP2 will now execute correctly, they both will eventually be retired.

As described, the processor in accordance with one embodiment of present invention includes a replay system 210 that replays instructions. Replay system 210 includes an early checker 102 and a late checker 104. Late checker 104 signals early checker 102 when it is replaying an instruction. This prevents a collision between an instruction replayed by early checker 102 and an instruction replayed by late checker 104.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although a replay system having up to two checkers is disclosed, in other embodiments of the present invention the replay system can have more than two checkers. Each successive checker detects a larger set of replay conditions, thus ensuring that an incorrectly executed operation is eventually detected and replayed. Each checker maintains a mechanism to force the operation to be replay safe at that checker to prevent collisions with operations being replayed by other downstream checkers.

What is claimed is:

1. A computer processor comprising:
   a multiplexer having a first input, a second input, a third input, and an output;
   a scheduler coupled to said multiplexer third input;
   an execution unit coupled to said multiplexer output; and
   a replay system having an input coupled to said multiplexer output, said replay system comprising:
   a first checker coupled to said replay system input and said first multiplexer input; and
   a second checker coupled to said first checker and said second multiplexer input.

2. The processor of claim 1, wherein said second checker is adapted to receive a second instruction and determine whether the second instruction executed correctly.

3. The processor of claim 2, said replay system further comprising:
   a second scoreboard coupled to said second checker;
   wherein said second checker is coupled to said execution unit; and wherein said second checker is adapted to determine whether the second instruction executed correctly based on said second scoreboard or a second external signal received from said execution unit.

4. The processor of claim 2, wherein said second checker is adapted to replay said second instruction and send a force replay safe signal to said first checker if it determines that the second instruction did not execute correctly.

5. The processor of claim 2, further comprising a retirement unit coupled to said replay system;
wherein said second checker is adapted to send the second instruction to said retirement unit if it determines that the second instruction executed correctly.

6. The processor of claim 4, wherein said first checker is adapted to receive a first instruction and determine whether the first instruction executed correctly.

7. The processor of claim 6, said replay system further comprising:
a first scoreboard coupled to said first checker;
wherein said first checker is coupled to said execution unit; and
wherein said first checker is adapted to determine whether the first instruction executed correctly based on said first scoreboard or a first external signal received from said execution unit.

8. The processor of claim 7, wherein said first checker is adapted to replay said first instruction if it determines that the first instruction did not execute correctly and said force replay safe signal is not received from said second checker.

9. The processor of claim 1, further comprising:
at least one second stage coupled between said second checker and said second multiplexer input; and
at least one first stage coupled between said first checker and said first multiplexer input.

10. The processor of claim 8, wherein said second checker replays the second instruction by sending the second instruction to said second multiplexer input, and said first checker replays the first instruction by sending the first instruction to said first multiplexer input.

11. The processor of claim 9, wherein an amount of said first stage differs from an amount of said second stage.

12. The processor of claim 7, wherein said first scoreboard is updated when said force replay safe signal is received by said first checker.

13. The processor of claim 7, wherein said second external signal is a superset of said first external signal.

14. A computer system comprising:
a bus;
a memory device coupled to said bus; and
a processor coupled to said bus, said processor comprising:
a multiplexer having a first input, a second input, a third input, and an output;
a scheduler coupled to said multiplexer third input;
an execution unit coupled to said multiplexer output; and
a replay system having an input coupled to said multiplexer output, said replay system comprising:
a first checker coupled to said replay system input and said first multiplexer input; and
a second checker coupled to said first checker and said second multiplexer input.

15. The computer system of claim 14, wherein said second checker is adapted to receive a second instruction and determine whether the second instruction executed correctly.

16. The computer system of claim 15, said replay system further comprising:
a second scoreboard coupled to said second checker;
wherein said second checker is coupled to said execution unit; and
wherein said second checker is adapted to determine whether the second instruction executed correctly based on said second scoreboard or a second external signal received from said execution unit.

17. The computer system of claim 15, wherein said second checker is adapted to replay said second instruction and send a force replay safe signal to said second checker if it determines that the second instruction did not execute correctly.

18. The computer system of claim 15, said processor further comprising a retirement unit coupled to said replay system;
wherein said second checker is adapted to send the second instruction to said retirement unit if it determines that the second instruction executed correctly.

19. The computer system of claim 17, wherein said first checker is adapted to receive a first instruction and determine whether the first instruction executed correctly.

20. The computer system of claim 19, said replay system further comprising:
a first scoreboard coupled to said first checker
wherein said first checker is coupled to said execution unit; and
wherein said first checker is adapted to determine whether the first instruction executed correctly based on said first scoreboard or a first external signal received from said execution unit.

21. The computer system of claim 20, wherein said first checker is adapted to replay said first instruction if it determines that the first instruction did not execute correctly and said force replay safe signal is not received from said second checker.

22. The computer system of claim 14, further comprising:
at least one second stage coupled between said second checker and said second multiplexer input; and
at least one first stage coupled between said first checker and said first multiplexer input.

23. The computer system of claim 21, wherein said second checker replays the second instruction by sending the second instruction to said second multiplexer input, and said first checker replays the first instruction by sending the first instruction to said first multiplexer input.

24. The computer system of claim 22, wherein an amount of said first stage differs from an amount of said second stage.

25. A method of processing a computer instruction, said method comprising:
(a) receiving the instruction by an execution unit and, in parallel, by a replay system;
(b) determining whether the instruction executed correctly at a first checker in said replay system; and
(c) determining whether the instruction executed correctly at a second checker in said replay system.

26. The method of claim 25, further comprising:
(d) repeating step (a) if it is determined that the instruction did not execute correctly at step (c).

27. The method of claim 26, further comprising:
(e) sending a force replay safe signal to the first checker if it is determined that the instruction did not execute correctly at step (c).

28. The method of claim 27, further comprising:
(d) repeating step (a) if it is determined that the instruction did not execute correctly at step (b) and the force replay safe signal was not received.

29. The method of claim 25, wherein step (b) comprises the step of:
determining whether the instruction executed correctly based on a first scoreboard coupled to the first checker or based on a first signal received from said execution unit.

30. The method of claim 29, wherein step (c) comprises the step of:
determining whether the instruction executed correctly based on a second scoreboard coupled to the second checker or based on a second signal received from said execution unit.

* * * * *